(No Model.)
G. B. FISHER.
SAUSAGE STUFFING MACHINE.
No. 359,144. Patented Mar. 8, 1887.
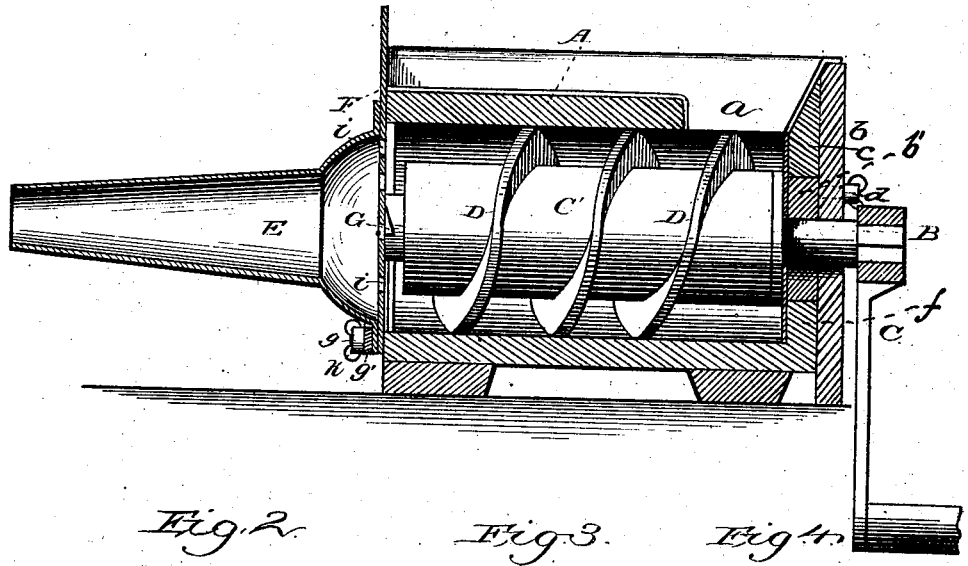
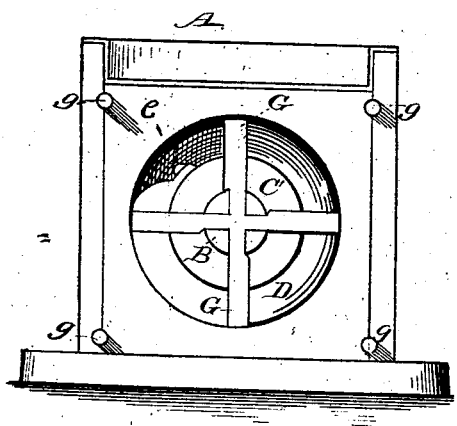 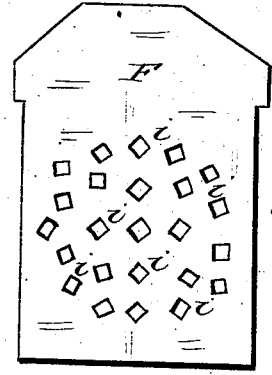 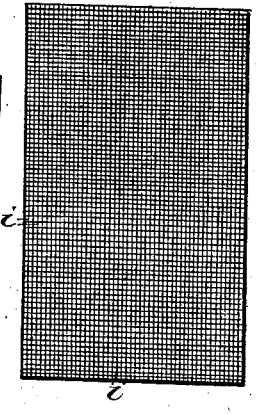
WITNESSES
INVENTOR
George B. Fisher
By his Attorney
E. Everett Ellis

UNITED STATES PATENT OFFICE.

GEORGE B. FISHER, OF DREHERSVILLE, PENNSYLVANIA.

SAUSAGE-STUFFING MACHINE.

SPECIFICATION forming part of Letters Patent No. 359,144, dated March 8, 1887.

Application filed March 7, 1885. Renewed September 29, 1886. Serial No. 214,850. (No model.)

*To all whom it may concern:*

Be it known that I, GEORGE B. FISHER, a citizen of the United States, residing at Drehersville, in the county of Schuylkill and State of Pennsylvania, have invented certain new and useful Improvements in Sausage-Stuffing Machines; and I do hereby declare the following to be a full, clear, and exact description of the invention, such as will enable others skilled in the art to which it appertains to make and use the same.

This invention relates to a machine for stuffing sausages, puddings, cheeses, and the like; and it consists, substantially, in the machine as constructed and in the particular combinations of parts, to be hereinafter distinctly described, and pointed out in the claim.

Referring to the accompanying sheet of drawings, Figure 1 represents a vertical side elevation in section of a machine embodying my improvements. Fig. 2 is an end elevation thereof, with portions removed, to more clearly indicate the construction and disposition of certain parts. Figs. 3 and 4 are detail views of the perforated plates through which the sausage-meat is forced into the bag or casing therefor.

The character of sausage-stuffing machines to which my invention is most nearly allied is that in which the meat is supplied through a hopper or feed-opening and fed forward or along to one end of the machine, whence it is forced through perforations in a plate located at such end of the machine into the bag or pouch for its reception, which is attached to the delivery spout or neck usually employed for that purpose. I have discovered that in the use of former machines of like nature the meat, when forced into the bag or pouch, becomes lumpy in part, no matter how finely it may have been minced or cut previous to being placed in the machine. This fault, it is thought, is due to the fact that the perforations in the plate through which the meat is forced are of a circular contour, which causes the meat to be forced through them in lumps, and the sausage consequently is not stuffed as nicely or perfectly as it would be if the meat were forced into it in a more thoroughly commingled mass. In experimenting with my invention I have discovered that the desired result is obtained by forming the perforations in the plate of an angular or square contour, which causes the meat to separate into smaller particles or divisions, and thus enable the same to be stuffed into the bag or pouch more compactly, the angular edges of the perforations acting to break or divide the strands or fiber of the meat in its passage through. Other features of my improvements will be set forth hereinafter.

Referring to the parts by the letters marked thereon, A represents the box or frame of the machine, having in its top, at or near one end, a suitable hopper-shaped opening or feed-aperture, $a$. Extending through the box from end to end is a shaft, B, to the outer end of which is attached an operating crank or handle, C. The end of the shaft to which the crank is attached has its bearing in the end wall, $b$, of the casing and a pressing-block, $b'$, located in an opening in an inner supplemental wall or partition, $c$, as shown. Set-screws $d$ extend through the wall $b$ and bear against the block $b'$, by which, on proper adjustment thereof, the shaft is caused to bear, to a greater or less extent, against the perforated plate, and the knives which are carried at that end of such shaft are consequently operated to divide or cut the meat to a greater or less degree of fineness.

Surrounding the shaft B and tightly fitting the same is a wooden collar or sleeve, C', around which the spirals or blades D extend, and are properly secured by a screw, $e$, as shown, a washer, $f$, being placed on said shaft at or near the opposite end to $e$, between the nut $b'$ and the end of collar C'. By this construction it will be seen that the parts can be readily separated or taken apart and replaced by substitutes therefor when worn or injured from use. The end of the shaft opposite to that on which the crank is located is formed with channels or grooves that cross each other at right angles and centrally of the cross-section of the shaft, approximating in outline to the shape of a cross. These grooves are for the reception of the shank portions of a set of knives, G, likewise formed in the shape of a cross, and which, when properly arranged or set in place, have their cutting portions or blades radial to the shaft, as shown. By this provision of attachment the knives may be more readily detached and a much stronger bearing is supplied therefor, the sides of the channels or grooves in which they are fitted firmly bracing and strengthening their shanks against any strain which may be exerted thereto in the operation of the machine.

E represents the conical spout, to which the sausage bag or pouch is attached for receiving the meat as it is forced from the machine. This spout is preferably formed to fit over an opening in the end of the casing of any suitable configuration. It is removably secured to the end of the casing by being fitted to screws $g$, projecting therefrom, suitable plates, $g'$, being placed on said screws and held thereto by nuts $h$, these devices serving to permit the easy and ready removal of the spout and the perforated plate, when necessary.

Between the spout E and the open end of the casing the perforated plate F is placed, the perforations therein being of an angular or square contour, as represented by letters $i$. The advantage of this form has been hereinbefore set forth, and need not here be referred to.

For stuffing cheeses and the like, where the particles are to be separated or divided exceedingly fine, I employ a piece of wire-gauze, (represented in Fig. 4,) whose openings or meshes are likewise square.

The operation is as follows: The meat is placed or fed to the machine through the opening $a$, and is carried along by the screw to the opposite end, where it is cut up by the knives and forced through the perforations in the plate into the spout and thence into the bag or pouch for its reception. By proper adjustment of set-screws $d$, the pressing-block $b'$ can be made to regulate the degree of fineness to which the meat is to be cut, in that the knives are brought into greater or less proximity to the perforated plate.

Having thus described my invention, what I claim is—

In a sausage-stuffing machine, the combination of a box or casing having a feed-aperture, the screw-shaft formed at one end with grooves crossing each other at right angles, cross-shaped knives fitting in said grooves, the plate F, having perforations of a square outline or contour, the pressing-block $b'$ for the shaft, and the adjusting-screw therefor extending through the casing and abutting against the block, all substantially as set forth, described, and shown.

In testimony whereof I affix my signature in presence of two witnesses.

GEORGE B. FISHER.

Witnesses:
E. EVERETT ELLIS,
M. P. CALLAN.